US009386142B2

(12) United States Patent
Craine

(10) Patent No.: US 9,386,142 B2
(45) Date of Patent: Jul. 5, 2016

(54) DRIVER ELECTRONIC DEVICE AUTOMATIC DEACTIVATION SYSTEM AND METHOD

(71) Applicant: Dean A Craine, Bellevue, WA (US)

(72) Inventor: Dean A Craine, Bellevue, WA (US)

( * ) Notice: Subject to any disclaimer, the term of this patent is extended or adjusted under 35 U.S.C. 154(b) by 463 days.

(21) Appl. No.: 13/715,890

(22) Filed: Dec. 14, 2012

(65) Prior Publication Data

US 2013/0157574 A1 Jun. 20, 2013

Related U.S. Application Data

(60) Provisional application No. 61/570,404, filed on Dec. 14, 2011.

(51) Int. Cl.
| | | |
|---|---|---|
| *H04M 1/725* | (2006.01) | |
| *H04M 1/60* | (2006.01) | |
| *H04W 4/00* | (2009.01) | |
| *H04W 4/04* | (2009.01) | |
| *H04W 4/12* | (2009.01) | |
| *H04W 8/00* | (2009.01) | |
| *H04L 12/58* | (2006.01) | |
| *H04W 84/18* | (2009.01) | |

(52) U.S. Cl.
CPC .......... *H04M 1/72577* (2013.01); *H04W 4/001* (2013.01); *H04W 4/046* (2013.01); *H04L 51/14* (2013.01); *H04M 1/6075* (2013.01); *H04M 1/72552* (2013.01); *H04M 2250/02* (2013.01); *H04W 4/008* (2013.01); *H04W 4/12* (2013.01); *H04W 8/005* (2013.01); *H04W 84/18* (2013.01)

(58) Field of Classification Search
CPC .......... H04M 1/72577; H04M 1/6075; H04W 4/008; H04W 4/12; H04W 8/005; H04W 4/001; H04W 4/046; H04L 51/14
USPC ......... 455/414, 414.4, 418, 412.2, 41.2, 41.3, 455/79, 569.1, 569.2, 575.9, 345
See application file for complete search history.

(56) References Cited

U.S. PATENT DOCUMENTS

| 6,711,474 B1 * | 3/2004 | Treyz ..................... G01C 21/26 455/414.1 |
|---|---|---|
| 8,787,936 B2 * | 7/2014 | Tibbitts ................. H04W 48/04 455/456.1 |

(Continued)

*Primary Examiner* — Andrew Wendell
(74) *Attorney, Agent, or Firm* — Dean A. Craine

(57) ABSTRACT

A system and method of automatically prevents a cellular telephone operated by a driver from receiving or transmitting text and email messages while driving a motor vehicle. The system includes a first Bluetooth transceiver located inside a motor vehicle configured to create a link, such as a piconet, with a compatible second Bluetooth receiver located in the cellular telephone that has text and email messaging capabilities. The cellular telephone includes a software program loaded into its memory designed to automatically disable the device's text and mail messaging capabilities when the link is created. Upon entering and starting the motor vehicle, the link is established, which automatically blocks or deactivates the telephone's transmission and receiving message capabilities. In one embodiment, the software program provides a menu page that allows the driver to selectively turn ON or OFF different features when the two transceivers are linked. Access to the menu page may be controlled by passwords.

5 Claims, 3 Drawing Sheets

(56) References Cited

U.S. PATENT DOCUMENTS

| | | | |
|---|---|---|---|
| 2007/0076672 A1* | 4/2007 | Gautier et al. | 370/338 |
| 2007/0173293 A1* | 7/2007 | Tran | H04M 1/6091 455/569.1 |
| 2010/0297929 A1* | 11/2010 | Harris | H04K 3/415 455/1 |
| 2011/0065375 A1* | 3/2011 | Bradley | H04M 1/72577 455/1 |
| 2011/0105097 A1* | 5/2011 | Tadayon | H04M 3/53 455/418 |
| 2011/0269441 A1* | 11/2011 | Silver | H04W 4/027 455/418 |
| 2012/0006611 A1* | 1/2012 | Wallace et al. | 180/272 |
| 2012/0244849 A1* | 9/2012 | Thomson | 455/418 |
| 2013/0137409 A1* | 5/2013 | Lee | H04M 1/006 455/417 |

\* cited by examiner

DRIVER ELECTRONIC DEVICE AUTOMATIC DEACTIVATION SYSTEM AND METHOD

This utility patent application is based on and claims the priority filing date benefit of U.S. provisional patent application (Application No. 61/570,404) filed on Dec. 14, 2011.

Notice is hereby given that the following patent document contains original material which is subject to copyright protection. The copyright owner has no objection to the facsimile or digital download reproduction of all or part of the patent document, but otherwise reserves all copyrights whatsoever.

BACKGROUND OF THE INVENTION

1. Field of the Invention

This invention pertains to systems or devices on portable electronic devices that limit the device's functionality when operated in an environment or location that requires the user's constant attention.

2. Description of the Related Art

Many states have passed laws preventing drivers from surfing the web and sending and receiving text or email messages while driving. The purpose of these laws is to reduce driver distraction believed to cause many motor vehicle accidents. In spite of fact that violators of these laws must pay large fines, many drivers ignore these laws and continue to search the web and send and receive text and email messages while driving. Because operating an electronic device in a motor vehicle is difficult to detect, law enforcement personnel find it difficult to find violating drivers.

Many motor vehicles have Bluetooth transmitters and receivers (hereinafter called Bluetooth transceivers) located inside the passenger compartments that can be linked to the smart keys and other Bluetooth transceivers located in cellular telephones and other devices commonly carried by a driver of a motor vehicle. Some motor vehicle Bluetooth transceivers are directly coupled or built into the motor vehicle's audio entertainment system, while others are aftermarket Bluetooth transceivers that selectively mounted onto a visor located over the driver or built into a GPS navigation and traffic device mounted on the dashboard. Such devices allow the driver to send and receive telephone calls in a 'hands free' manner via their cellular telephones.

Bluetooth transceivers in two devices must be linked to 'paired' in order to communicate. When paired, a piconet is created between them that remains activate so long as the transceivers are activated and operated within a transmission range (typically 30 feet). Once paired, the two transceivers will automatically reconnect when activated and moved within the transmission range. Today, most drivers will 'pair' the Bluetooth transceiver in their cellular telephone to the motor vehicle's Bluetooth transceiver so that each time the driver enters the motor vehicle with the cellular telephone, the transceivers are automatically linked together.

What is needed is a system and method of temporarily preventing the surfing of the web or the transmission and receipt of text and email messages when the electronic device that is normally configured to surf the web and to transmit and receive text and email messages, is activated and located in a motor vehicle with a Bluetooth transceiver.

SUMMARY OF THE INVENTION

It is an object of the present invention to provide a system and method of automatically preventing the web surfing and text and email transmission capabilities of a Bluetooth enabled electronic device controlled or operated by a driver when the electronic device is located inside a motor vehicle.

The system includes a Bluetooth transceiver located inside a motor vehicle configured to create a Bluetooth piconet with a Bluetooth-enabled electronic device, such as a 'smart' cellular telephone, a MP3 player, a tablet computer or a laptop computer. It should be understood that such devices may include any electronic device with a Bluetooth transceiver that requires the review of visually information and the inputting of manual or verbal instructions when operating. Upon entering the motor vehicle, a link, such as a piconet, is automatically setup between the motor vehicle's Bluetooth transceiver and the Bluetooth transceiver located or coupled to the electronic device. When linked together, the system may be setup to automatically disable all voice and data telephone communications with the electronic device or it may be setup up to automatically disable some voice and data telephone communications and allow the transmission and receipt of voice and data communications from a specific list of callers or senders. The system also may be setup to allow the driver to make and receive telephone calls in a 'hands-free' manner using the motor vehicle's Bluetooth transceiver, but disable the SMS and MMS text services and email service while driving.

More specifically, the communication device includes a software program loaded into the electronic device's memory that discontinues the device's voice and data communication capabilities and/or the device's audio file playback and/or recording features that can be distracting to a driver when driving. In one embodiment, a triggering or blocking signal is generated when a piconet is created between the Bluetooth-enabled electronic device and the motor vehicle's Bluetooth transceiver and changes the device's operating state. In one embodiment, the software program presents a menu page that allows the driver or his or her guardian to setup different features that may be automatically disabled or limited on the electronic device when the piconet is created. Access to the menu page may be controlled by passwords.

DESCRIPTION OF THE PREFERRED EMBODIMENT(S)

Figure 1:
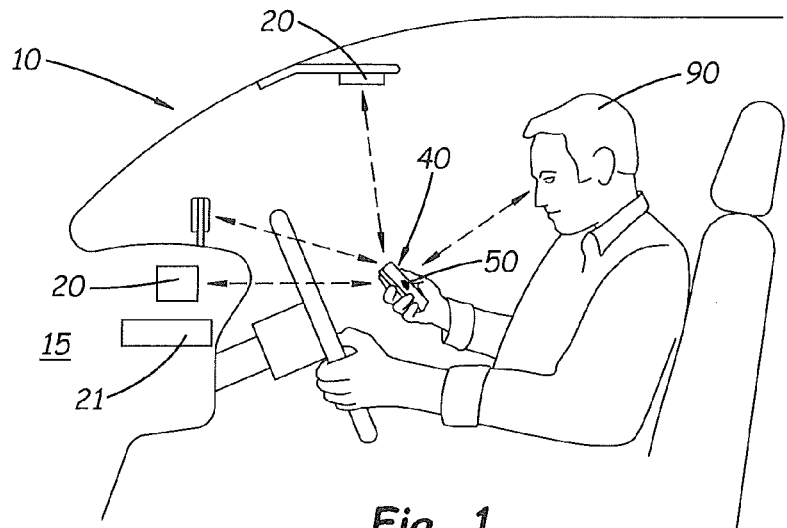
FIG. 1 is an illustration of a driver of a motor vehicle with a Bluetooth transceiver linked to a communication device, such as a cellular telephone, held in the driver's hand.
Figure 2:
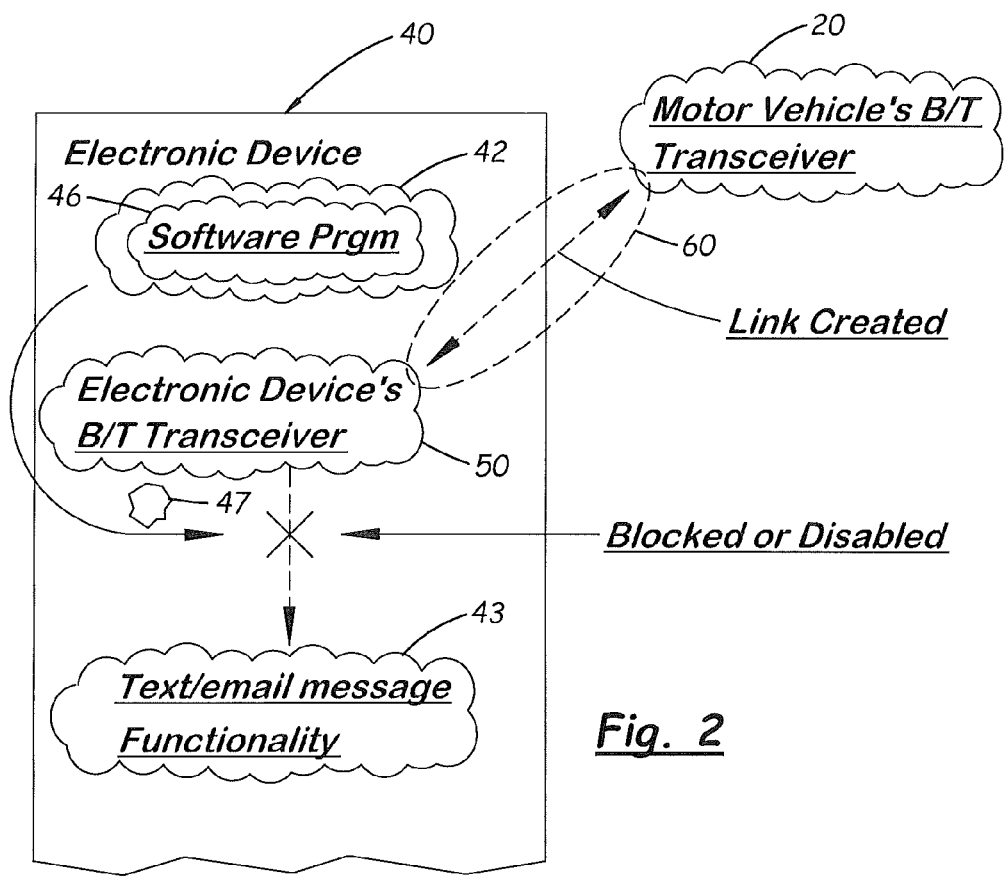
FIG. 2 is an illustration of showing a motor vehicle's Bluetooth transceiver and communication device's Bluetooth transceiver being linked with a software program loaded into the memory of the communication device configured to disable the device's text/email message functionality when the transceivers are linked.

Referring to the accompanying Figs. there is shown a system 10 and method that automatically prevents a cellular telephone 40 operated by a driver 90 from receiving or transmitting text and email messages while driving a motor vehicle 15. The system 10 includes a first Bluetooth transceiver 20 located inside a motor vehicle 15 configured to create a Bluetooth piconet 60 with the Bluetooth transceiver 50 in a Bluetooth enabled cellular telephone 40 with text and email messaging capabilities when the cellular telephone 40 is operating in the vicinity of the motor vehicle 15. Upon entering the motor vehicle 15, a piconet 60 is automatically setup between the motor vehicle's Bluetooth transceiver, hereinafter known as the first Bluetooth transceiver 20, and the electronic device's Bluetooth transceiver, hereinafter known as the second Bluetooth transceiver 50.

In the first embodiment, the cellular telephone 40 includes working memory 42 and a software program 46 is loaded into the device's working memory 42 that blocks or disables the cellular telephone's text messaging and email messaging capabilities, generally indicated by the reference number 43, when a piconet 60 is created between the first and second Bluetooth transceivers 20 and 50. The software program 46 is similar to the 'Do Not Disturb' feature found on Apple, Inc.'s recently released IOS 6 operating program used with its popular cellular telephones. The 'Do Not Disturb' feature enables users to manually control or time control when telephone calls or text messages, or email messages are received on the cellular telephone. The electrical components and the software programs enable a user to selectively control when text and email messages are received by the cellular telephone.

One drawback with the 'Do Not Disturb' feature found in IOS 6, is that the feature is activated only when the cellular telephone is in sleep mode. If the cellular telephone remains active, the 'Do Not Disturb' feature is deactivated and cellular telephone continues to receive telephone calls and text and email messages.

The software program 46 allows users to manually activate the system 10 only when a piconet 60 is generated, or to automatically activate the system 10 when the cellular telephone 40 is activated. These features may be especially important to parents concerned about teenage drivers reading and texting messages while driving. By setting up the teenager's cellular telephone 40 so the system 10 is always activated or activated when ever a piconet 60 is created with the family's motor vehicle, the text and email messaging via the teenager's cellular telephone 40 is automatically blocked or deactivated.

When initially setting up the system 10, the software program 46 creates a setup menu page 70 presented on the electronic device's display. On the setup menu page 70, the user may select different software controlled operations. Setup menu page 70 may include a general ON/OFF slide button 72. The general ON/OFF Slide button 72 may be on a separate page. When the slide button 72 is moved to the ON position, a second function button 74 may be presented that allows the user to select if the program 46 is activated continuously or activated only when a piconet 60 is detected. A third function button 74 may be presented that enables the user to select whether selected text and mail messages may be received or sent from and to selected senders and recipients. For example, if a parent wanted to send an urgent text or email message to the teenager driver, then the parent would list her telephone number or email address in the selected senders and recipients list.

To prevent unauthorized individuals from changing the settings on the setup menu page 70, the setup menu page 70 could include password entry boxes that present the setup menu page 70 buttons only upon submission of the correct password.

When a piconet 60 is created between the first and second Bluetooth transceivers 20, 50, respectively, the software program 46 generates a signal 47 that blocks or deactivates the receipt and transmission of text and email messages from the cellular telephone 40. In one embodiment, the signal 47 temporarily blocks or deactivates the device's SMS and MMS service or blocks or deactivates the device's email accounts saved on the cellular telephone 40. For example, the incoming POP3 mail server could be blocked or deactivated, or the outgoing SMTP mail service may be blocked or deactivated. When the piconet 60 is no longer detected, (i.e. if the motor vehicle 15 is turned off or the cellular telephone 40 is removed from the transmission range so the piconet 60 is no longer created), the blocking signal 47 is discontinued because the software program 46 is automatically closed or programmed to no longer produce the blocking signal 47. When the blocking signal 47 is discontinued, the electronic device's text and email message capabilities 43 return to their original state.

It should be understood, that the cellular telephone 40 may be a Bluetooth enabled cellular telephone, a Bluetooth enabled MP3 player, a Bluetooth enabled tablet computer or a Bluetooth enabled laptop computer. Because most drivers pair the second Bluetooth transceivers 50 in their cellular telephones 40 to the first Bluetooth transceivers 20 in the motor vehicles 15 to make and receive hands free telephone calls or to transmit audio signals from the electronic device 50 to the motor vehicle's audio entertainment system 21, the system 10 will automatically discontinue text and message service while driving. Because other electronic devices operated by other passengers are not paired with the first Bluetooth receiver 20, their electronic devices will continue to operate in a normal manner and receive and transmit text and email messages.

Figure 3:
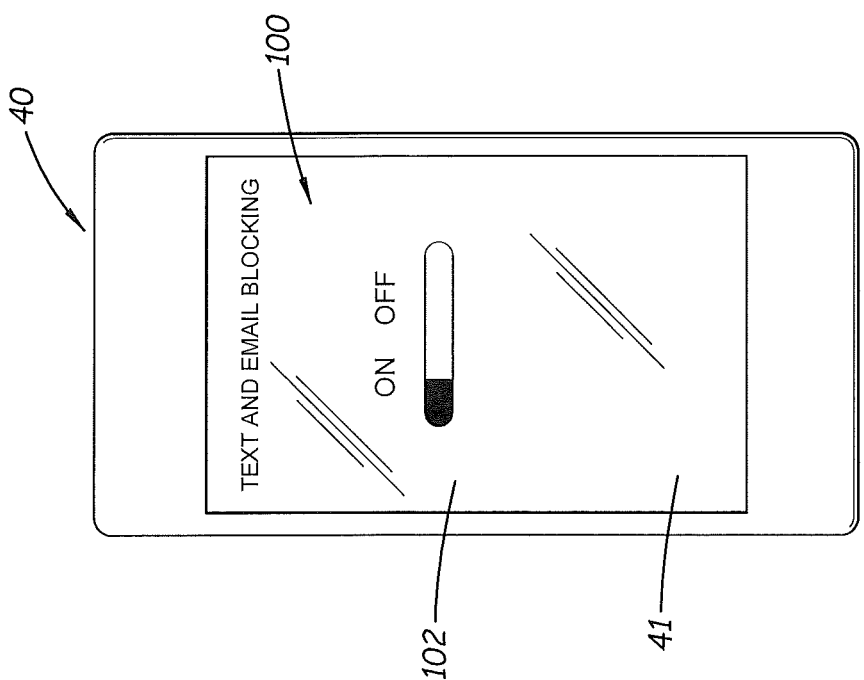
FIG. 3 is an illustration of an electronic device with a menu page presented on its display with a sliding ON or OFF button.

FIG. 3 is an illustration of a cellular telephone 40 with an activation menu page 100 on its display 41 with a sliding ON or OFF button 102 that turns the system 10 on or off.

Figure 4:
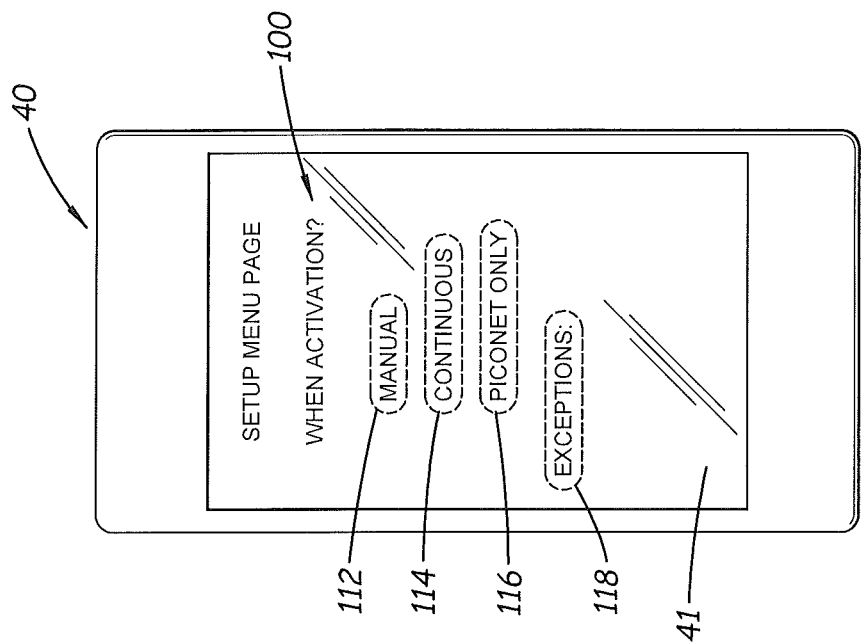
FIG. 4 is an illustration of an electronic device with a setup menu page presented on its display that includes buttons that enable the user to select when the system is activated, manually, continuously, or only when a piconet is detected.

FIG. 4 is an illustration of a cellular telephone with a setup menu page 110 on its display 41 that includes buttons 112, 114, 116, and 118 that enable the user to select when the system is activated, manually, continuously, or only when a piconet is detected and whether exceptions are allowed, respectively.

Figure 5:
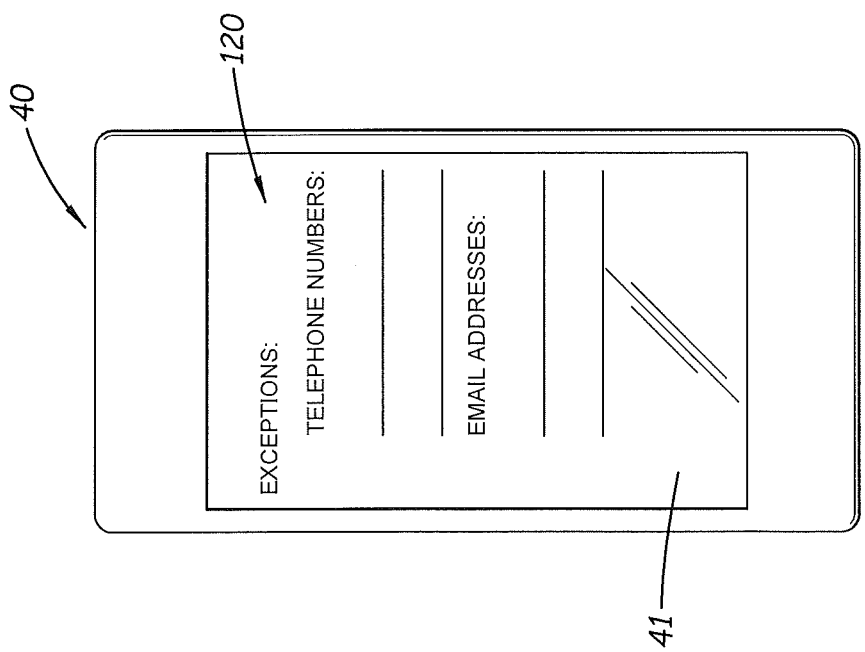
FIG. 5 is an illustration of an electronic device with an exception menu page presented on its display that enables the user to indicated telephone numbers and email addresses from which text and email messages can be received and sent when the system is activated.

FIG. 5 is an illustration of a cellular telephone 40 with an exception menu page 120 on its display 41 that enables the user to indicated telephone numbers and email addresses from which text and email messages can be received and sent when the system 10 is activated.

Figure 6:
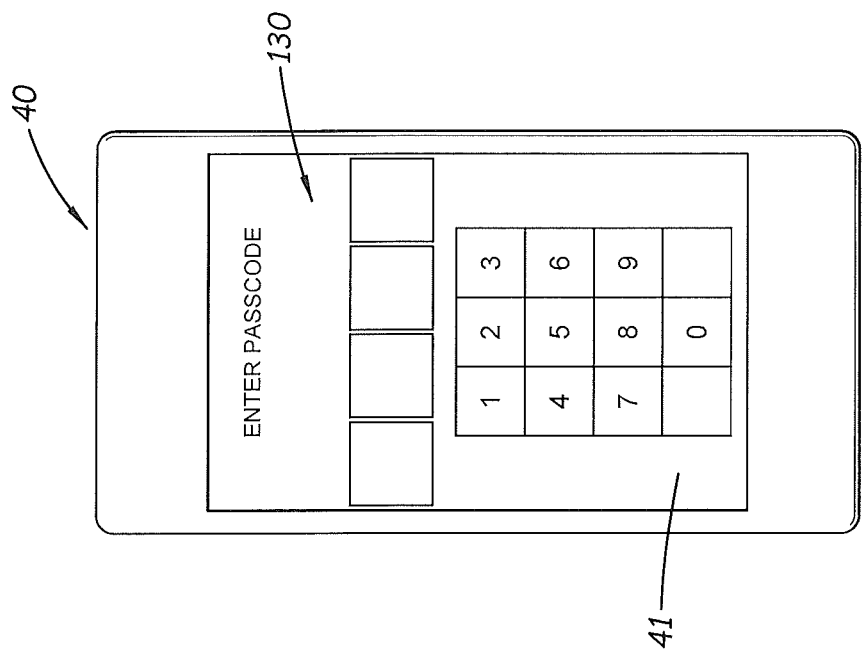
FIG. 6 is an illustration of an electronic device with a enter password menu page that is presented to the user before the activation menu page, the system setup menu page, and the exception pages are presented.

FIG. 6 is an illustration of a cellular telephone 40 with a enter password menu page 130 presented on the display 41 to the user before the activation menu page 100, the system setup menu page 110, and the exception page menu 120 are presented.

Using the above system, a method for discontinuing the receipt or transmission of text to and from a cellular telephone configured to communicate with a nearby wireless communication network while driving a motor vehicle, comprising the following steps:

a. selecting a motor vehicle with a first Bluetooth transceiver located therein, said Bluetooth transceiver configured to communicate with a second Bluetooth transceiver in a cellular telephone when the electronic device is in the vicinity of the first Bluetooth receiver and automatically create a piconet between the first Bluetooth transceiver and the second Bluetooth transceiver;

b. selecting an activated cellular telephone with text message communication capabilities, the cellular telephone includes a second Bluetooth transceiver adapted to automatically create a piconet with a first Bluetooth transceiver when the cellular telephone is in the vicinity of the first Bluetooth transceiver, the cellular telephone also includes a software program that automatically blocks or deactivates the text message communication capabilities of the cellular telephone with a piconet is created between the first Bluetooth receiver and the second Bluetooth receiver;

c. transporting the cellular telephone into the motor vehicle to be driven by a user of the cellular telephone; and, d. activating the motor vehicle and the first Bluetooth transceiver thereby automatically creating a piconet between the first Bluetooth transceiver and the second Bluetooth transceiver, and blocking or deactivating the text message communication capabilities on the cellular telephone.

I claim:

1. A cellular telephone used by a driver operating a moving motor vehicle configured to send and receive text or email messages and also configured to automatically link with a first Bluetooth transceiver located in the motor vehicle and coupled to a motor audio entertainment system so that telephone calls to or from said cellular telephone are heard through said audio entertainment system, said cellular telephone, comprising:

a. a display;

b. a second Bluetooth transceiver located inside said cellular telephone that automatically links to and creates a piconet with said first Bluetooth transceiver when said cellular telephone is operated in said motor vehicle;

c. a software program that automatically discontinues the receipt and transmission of text messages or email messages to and from said cellular telephone when said piconet is formed between said first Bluetooth transceiver and said second Bluetooth transceiver;

d. at least one password menu page presented on said display configured by said software program; and, e. wherein when said cellular telephone is operated inside said motor vehicle and said first Bluetooth transceiver and said second Bluetooth transceiver automatically pair and create a piconet and telephone calls to said cellular telephone are heard through said audio entertainment system, and the receipt or transmission of text messages or email messages on said cellular telephone is also blocked or disabled.

2. A cellular telephone used by a driver operating a moving motor vehicle configured to send and receive text or email messages and also configured to automatically link with a first Bluetooth transceiver located in the motor vehicle and coupled to a motor audio entertainment system so that telephone calls to said cellular telephone are heard through said audio entertainment system, said cellular telephone, comprising:

a. a display;

b. a second Bluetooth transceiver located inside said cellular telephone that automatically links to and creates a piconet with said first Bluetooth transceiver when said cellular telephone is operated in said motor vehicle;

c. a software program that automatically discontinues the receipt and transmission of text messages or email messages to and from said cellular telephone when said piconet is formed between said first Bluetooth transceiver and said second Bluetooth transceiver;

d. an exception menu page presented by said software program that lists at least one telephone number or at least one email address of a receiver or sender that may receive or send a telephone call, a text message or an email message, and;

e. wherein when said cellular telephone is operated inside said motor vehicle and said first Bluetooth transceiver and said second Bluetooth transceiver automatically pair and create a piconet, telephone calls to said cellular telephone are heard through said audio entertainment system, and the receipt and transmission of text messages or email messages on said cellular telephone is blocked or disabled.

3. A system for automatically blocking or disabling by the receipt or transmission of text messages or email messages on a cellular telephone link to the motor vehicle's audio entertainment system so that telephone calls are heard through said audio entertainment system, the system comprising;

a. a motor vehicle with an audio entertainment system;

b. a first Bluetooth transceiver located in said motor vehicle and connected to said audio entertainment system, said first Bluetooth transceiver configured to automatically send and receive telephone calls in a hands free manner through said audio entertainment system when paired to a Bluetooth-enabled cellular telephone operated inside said motor vehicle;

c. a cellular telephone operated by a driver with a second Bluetooth transceiver configured to pair and create a piconet with said first Bluetooth transceiver when said cellular telephone is operated inside said motor vehicle and automatically send and receive telephone calls in a hands free manner through said audio entertainment system when said second Bluetooth transceiver is paired to said first Bluetooth transceiver, said cellular telephone includes a display; and, d. a software program activated in said cellular telephone, said software program configured to automatically block or disable the receipt and transmission of text messages or email messages on said cellular telephone when a piconet is created between said first Bluetooth transceiver and said second Bluetooth transceiver, said software program configured to present an exception menu page that lists at least one telephone number or at least one email address of a receiver or sender that may receive or sent a text message or email message to said cellular telephone.

4. A method for blocking or disabling the receipt and/or transmission of text messages or email messages by a cellular telephone linked to a motor vehicle's audio entertainment system enabling telephone calls to be heard in a hands free manner through said motor vehicle's audio entertainment system coupled to a first Bluetooth transceiver, said method comprises the following steps:

a. selecting a cellular telephone with memory, a display, and a second Bluetooth transceiver configured to automatically pair with said first Bluetooth transceiver when operated in the vicinity;

b. loading a software program into said memory of said cellular telephone, said software program configured to automatically block or disable text messaging or email messages on said cellular telephone when a piconet is created between said first Bluetooth transceiver and said second Bluetooth transceiver, said software program configured to present an exception menu page on said display that lists at least one telephone number or at least one email address of a receiver or sender who may receive or sent a voice telephone message, a text message or email message to said cellular telephone, and, c. transporting said cellular telephone operated by a driver to said motor vehicle thereby causing said first Bluetooth transceiver and said second Bluetooth transceiver to pair and create a piconet so that telephone calls to and from said cellular telephone are transmitted through said audio entertainment system while said software program blocks or disables text messaging or email messages on said cellular telephone.

5. A system for automatically blocking or disabling by the receipt or transmission of text messages or email messages on a cellular telephone link to the motor vehicle's audio entertainment system so that telephone calls are heard through said audio entertainment system, the system comprising;

a. a motor vehicle with an audio entertainment system;

b. a first Bluetooth transceiver located in said motor vehicle and connected to said audio entertainment system, said first Bluetooth transceiver configured to automatically send and receive telephone calls in a hands free manner through said audio entertainment system when paired to a Bluetooth-enabled cellular telephone operated inside said motor vehicle;

c. a cellular telephone operated by a driver with a second Bluetooth transceiver configured to pair and create a piconet with said first Bluetooth transceiver when said cellular telephone is operated inside said motor vehicle and automatically send and receive telephone calls in a hands free manner through said audio entertainment system when said second Bluetooth transceiver is paired to said first Bluetooth transceiver, said cellular telephone includes a display; and, d. a software program activated in said cellular telephone, said software program configured to automatically block or disable the receipt and transmission of text messages or email messages on said cellular telephone when a piconet is created between said first Bluetooth transceiver and said second Bluetooth transceiver, said software program configured to present a password menu page on said display enabling a user to selectively activate or deactivate said software program.

* * * * *